United States Patent
Chatterjee et al.

(10) Patent No.: US 10,517,119 B2
(45) Date of Patent: Dec. 24, 2019

(54) APPARATUSES, SYSTEMS, AND METHODS FOR PROBABILISTIC TRANSMISSION OF DEVICE-TO-DEVICE (D2D) DISCOVERY MESSAGES

(71) Applicant: Intel IP Corporation, Santa Clara, CA (US)

(72) Inventors: Debdeep Chatterjee, Mountain View, CA (US); Alexey Khoryaev, Nizhny Novgorod (RU); Gang Xiong, Beaverton, OR (US); Seunghee Han, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 263 days.

(21) Appl. No.: 15/505,887

(22) PCT Filed: Jun. 26, 2015

(86) PCT No.: PCT/US2015/037885
§ 371 (c)(1),
(2) Date: Feb. 22, 2017

(87) PCT Pub. No.: WO2016/048428
PCT Pub. Date: Mar. 31, 2016

(65) Prior Publication Data
US 2017/0280482 A1    Sep. 28, 2017

Related U.S. Application Data

(60) Provisional application No. 62/069,711, filed on Oct. 28, 2014, provisional application No. 62/055,600, filed on Sep. 25, 2014.

(51) Int. Cl.
*H04W 74/08* (2009.01)
*H04W 8/00* (2009.01)
(Continued)

(52) U.S. Cl.
CPC ......... *H04W 74/0833* (2013.01); *H04L 67/16* (2013.01); *H04W 8/005* (2013.01); *H04W 48/04* (2013.01); *H04W 92/18* (2013.01)

(58) Field of Classification Search
CPC ...... H04W 8/005; H04W 76/14; H04W 76/23
See application file for complete search history.

(56) References Cited

U.S. PATENT DOCUMENTS

2014/0086200 A1   3/2014   Seok
2014/0141789 A1   5/2014   Tarokh et al.
(Continued)

FOREIGN PATENT DOCUMENTS

CN   102939788 A   2/2013
EP     2693677 A1   2/2014
(Continued)

OTHER PUBLICATIONS

European Patent Office—Article 94(3) issued Jun. 5, 2018 from European Patent Application No. 15736364.9, 6 pages.
(Continued)

*Primary Examiner* — Marcus Smith
(74) *Attorney, Agent, or Firm* — Schwabe, Williamson & Wyatt, P.C.

(57) ABSTRACT

Embodiments described herein relate generally to techniques for device discovery for device-to-device (D2D) communications. A user equipment (UE) may receive a transmission probability (e.g., from an evolved Node B (eNB)) for transmission of a discovery medium access control (MAC) protocol data unit (PDU) for D2D communications. The UE may determine a pseudo-random number based on an identifier of the UE, information in the discovery MAC PDU, or information associated with a discovery period. The UE may compare the pseudo-random number with the transmission probability to determine whether to
(Continued)

transmit the discovery MAC PDU in the discovery period. Another UE may also determine the pseudo-random number to determine whether the UE is to transmit the discovery MAC PDU in the discovery period. Other embodiments may be described and claimed.

14 Claims, 4 Drawing Sheets

(51) Int. Cl.
  *H04W 48/04* (2009.01)
  *H04L 29/08* (2006.01)
  *H04W 92/18* (2009.01)

(56) References Cited

U.S. PATENT DOCUMENTS

| | | | |
|---|---|---|---|
| 2015/0043448 A1 | 2/2015 | Chatterjee et al. | |
| 2015/0043483 A1* | 2/2015 | Sartori | H04W 72/02 370/329 |
| 2015/0341772 A1* | 11/2015 | Liang | H04W 8/005 455/434 |
| 2016/0037547 A1* | 2/2016 | Yang | H04W 4/70 370/329 |
| 2016/0044694 A1* | 2/2016 | Park | H04W 72/10 370/329 |
| 2016/0127881 A1* | 5/2016 | Kim | H04L 5/0032 370/328 |
| 2016/0302251 A1 | 10/2016 | Chatterjee et al. | |

FOREIGN PATENT DOCUMENTS

| | | |
|---|---|---|
| GB | 2359700 A | 8/2001 |
| TW | 201434304 A | 9/2014 |
| WO | 2014070058 A1 | 5/2014 |
| WO | 2015021267 A1 | 2/2015 |

OTHER PUBLICATIONS

3GPP TS 36.211 V12.2.0 (Jun. 2014); "Technical Specification Group Radio Access Network; Evolved Universal Terrestrial Radio Access (E-UTRA); Physical channels and modulation (Release 12)," 121 pages.
Taiwan Patent Office; Office Action dated Aug. 4, 2016 for Patent Application No. 104127015; 10 pages.
Intel Corporation; "On the need for interference control for Type 1 discovery," Agenda Item: 7.2.1.2.6, R1-144098 3GPP TSG RAN WG1 Meeting #78bis, Ljubljana, Slovenia, Oct. 6-10, 2014; 8 pages.
Intel Corporation; "On remaining details of D2D discovery," Agenda Item: 6.2.1.8, R1-144654 3GPP TSG RAN WG1 Meeting #79, San Francisco, USA, Nov. 17-21, 2014; 7 pages.
LG Electronics; "Operation in Type 1 Resource Allocation for D2D Discovery," Agenda Item: 6.2.5.2.1, R1-142149 3GPP TSG RAN WG1 Meeting #77, Seoul, Korea, May 19-23, 2014; 11 pages.
International Search Report and Written Opinion for International Application No. PCT/US2015/037885 dated Sep. 8, 2015; 14 pages.
Research in Motion, UK Limited; "On Remaining Details of Association between DMRS Port and E-PDCCH Transmission," Agenda Item: 6.2.3.4, R1-125064 3GPP TSG RAN WG1 Meeting #71, New Orleans, USA Nov. 12-16, 2012; 6 pages.
Anonymous; "Pseudorandom binary sequence"; Feb. 22, 2013; 2 pages.

* cited by examiner

APPARATUSES, SYSTEMS, AND METHODS FOR PROBABILISTIC TRANSMISSION OF DEVICE-TO-DEVICE (D2D) DISCOVERY MESSAGES

CROSS REFERENCE TO RELATED APPLICATIONS

The present application is a national phase entry under 35 U.S.C. § 371 of International Application No. PCT/US2015/037885, filed Jun. 26, 2015, entitled "APPARATUSES, SYSTEMS, AND METHODS FOR PROBABILISTIC TRANSMISSION OF DEVICE-TO-DEVICE (D2D) DISCOVERY MESSAGES", which claims priority under 35 U.S.C. § 119(e) to U.S. Provisional Patent Application No. 62/055,600, entitled "METHODS FOR PROBABILISTIC TRANSMISSION FOR D2D DISCOVERY" and filed Sep. 25, 2014, and to U.S. Provisional Patent Application No. 62/069,711, entitled "METHODS FOR PROBABILISTIC TRANSMISSION FOR D2D DISCOVERY" and filed Oct. 28, 2014, the entire disclosures of which are incorporated herein by reference.

FIELD

Embodiments of the present invention relate generally to the technical field of data processing, and more particularly, to techniques for device-to-device communication.

BACKGROUND

A user equipment (UE) may use device-to-device (D2D) communications to communicate directly with another UE, e.g., without routing the communications through an evolved Node B (eNB). In Type 1 D2D discovery procedure, the network may allocate a pool of discovery resources in the form of periodically occurring sets of physical time-frequency resources for transmission of D2D discovery medium access control (MAC) packet data units (PDUs). A transmitting UE randomly selects an individual resource from within the discovery pool for each discovery period for transmission of a D2D discovery MAC PDU. When there are a large number of UEs participating in the D2D discovery procedure in the pool of discovery resources, there may be a high probability of collisions, thereby leading to a significant decrease in the overall performance in terms of the number of devices discovered by D2D UEs.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, circuitry may be implemented in, or functions associated with the circuitry may be implemented by, one or more software or firmware modules.

Figure 1:
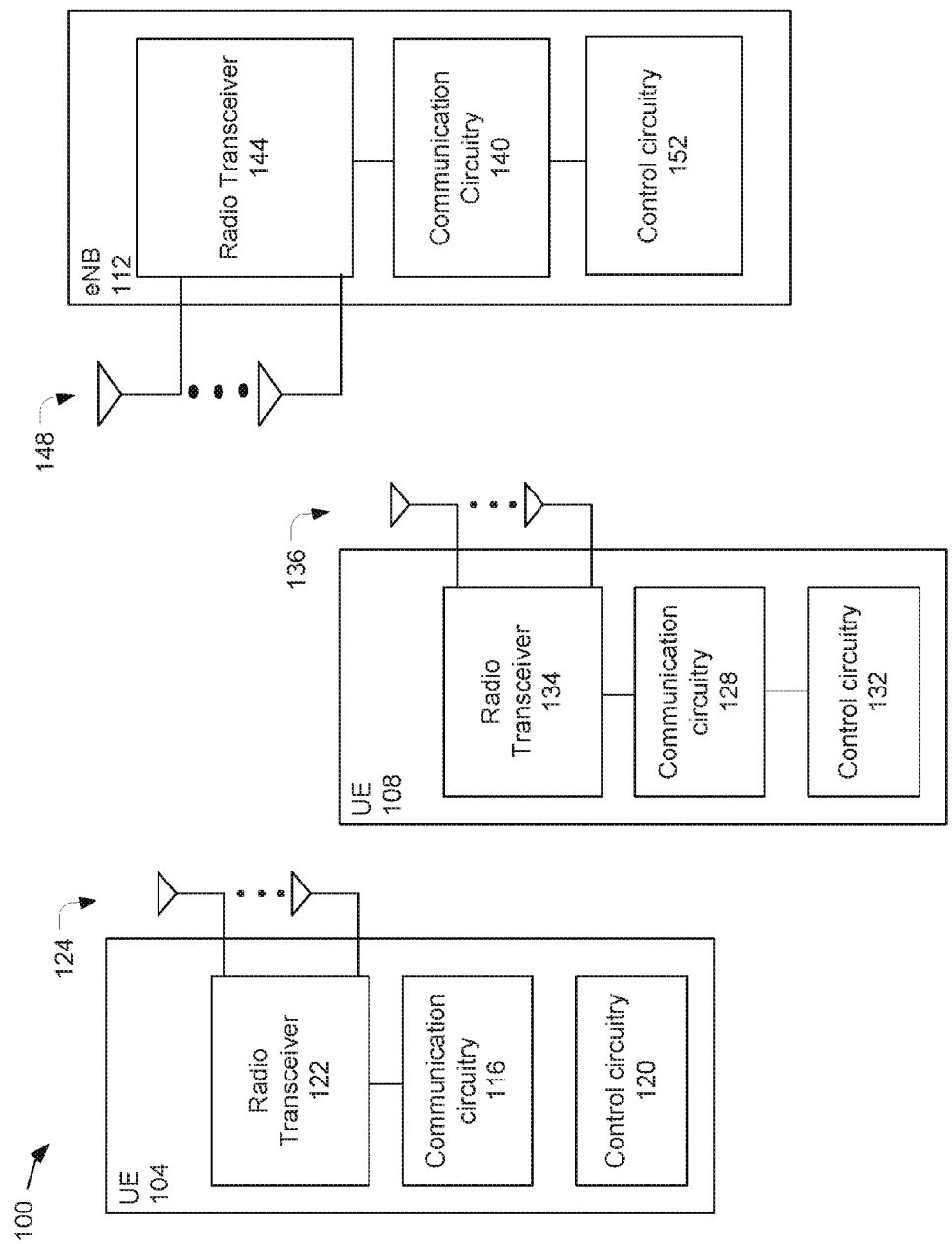
FIG. 1 is a block diagram showing a wireless communication environment including user equipments (UEs) and an evolved Node B (eNB), in accordance with various embodiments.

FIG. 1 schematically illustrates a wireless communication environment 100 in accordance with various embodiments. The environment 100 may include a UE 104, a UE 108, and an evolved Node B (eNB) 112. In embodiments, the UE 104 and UE 108 may communicate wirelessly with one another via device-to-device (D2D) communications. In D2D communications, the UE 104 and UE 108 may wirelessly communicate (e.g., transmit or receive) signals directly between one another (e.g., without routing the signals through the eNB 112).

In some embodiments, the UE 104 and/or UE 108 may also be in wireless communication with an access node such as the evolved node B (eNB) 112. The eNB 112 may be part of a 3rd Generation Partnership Project (3GPP) long-term evolution (LTE) network (or an LTE-Advanced (LTE-A) network). In particular, the eNB 112 may be part of a radio access network (RAN) of the LTE/LTE-A network, such as an evolved universal terrestrial radio access network (E-UTRAN). The E-UTRAN may be coupled with a core network such as an Evolved Packet Core (EPC) that performs various management and control functions of the LTE/LTE-A network and further provides a communication interface between various RANs and other networks.

UE 104 may include communication circuitry 116, control circuitry 120, radio transceiver 122, and one or more antennas 124. Communication circuitry 116 may interface with the radio transceiver 122 to receive D2D signals from and/or send D2D signals to the UE 108 via the one or more antennas 124. The communication circuitry 116 may also interface with the transceiver 122 to receive downlink transmissions from eNB 112 and transmit uplink transmissions to eNB 112 via the one or more antennas 124. In some embodiments, the communication circuitry 116 may be baseband circuitry, and the transceiver 122 may be radio frequency (RF) circuitry. The control circuitry 120 may be coupled to communication circuitry 116, and may be configured to decode and encode information transmitted in signals communicated between the UE 104 and the UE 108 and/or eNB 112. Control circuitry 120 may further be configured to perform any portion of the processes described below.

UE 108 may include similar components and/or functionality to UE 104. For example, UE 108 may include communication circuitry 128, control circuitry 132, radio transceiver 134, and one or more antennas 136. Communication circuitry 128 may interface with the radio transceiver 134 to receive D2D signals from and/or send D2D signals to the UE 104 via the one or more antennas 136. The communication circuitry 128 may also interface with the radio transceiver 134 to receive downlink transmissions from eNB 112 and transmit uplink transmissions to eNB 112 via the one or more antennas 136. Control circuitry 132 may be coupled to communication circuitry 128, and may be configured to decode and encode information transmitted in signals communicated between the UE 108 and the UE 104 and/or eNB 112. Control circuitry 132 may further be configured to perform any portion of the processes described below.

The UE 104 and/or UE 108 may be any type of computing device equipped with broadband circuitry and adapted to communicate with another UE via D2D communications and/or to operate on a cell of a wireless communication network according to, for example, one or more 3GPP technical specifications. The wireless cell may be provided by the eNB 104.

The eNB 112 may include communication circuitry 140 to interface with radio transceiver 144 to receive uplink transmissions from UE 104 or UE 108 via one or more antennas 148 and transmit downlink transmissions to UE 104 or UE 108 via the one or more antennas 148. eNB 112 may also include control circuitry 152 coupled with communication circuitry 140. In embodiments control circuitry 152 may be configured to decode and encode information transmitted in signals communicated between the UE 104 or UE 108 and eNB 112.

In various embodiments, the eNB 112 (e.g., the control circuitry 152 of the eNB 112) may allocate a discovery pool of discovery resources that are to be used by UEs associated with a cell provided by the eNB 112 (e.g., UEs for which the eNB 112 provides the serving cell or camping cell), such as the UE 104 and/or UE 108, for D2D discovery (e.g., Type 1 D2D discovery). The discovery resources of the discovery pool may correspond to physical resources in the time-frequency domain. The discovery pool may include discovery periods that include sets of physical resources. The discovery periods may occur periodically.

In some embodiments, the discovery resources may correspond to resources of the uplink (UL) spectrum that would otherwise be allocated for UL transmissions from UEs to the eNB 112. For example, the discovery resources may occur periodically within the uplink (UL) spectrum (e.g., in frequency-division duplexing (FDD) deployments) or on a subset of uplink subframes (e.g., in time-division duplexing (TDD) deployments). In other embodiments, the discovery resources may include other resources of the licensed spectrum or may include resources of other wireless spectrum, such as unlicensed spectrum, that is not used for communications between the eNB 112 and UEs of the cell (e.g., the UEs 104 and 108). In some embodiments, the eNB 112 may signal the allocated discovery pool to the UE 104 and UE 108 (e.g., using common Radio Resource Control (RRC) signaling, such as in System Information Block (SIB) type 19).

In various embodiments, the UEs (e.g., the UE 104 and/or UE 108) that are interested in discovering other D2D UEs with which to communicate may transmit a discovery medium access control (MAC) packet data unit (PDU) using one or more discovery resources in a discovery period of the discovery pool. The UE may randomly select one or more discovery resources of the discovery period on which to transmit the discovery MAC PDU. The UE may use a plurality of discovery resources, for example, if repeated transmission of discovery signals within a discovery period is configured.

In various embodiments, the eNB 112 may further signal a transmission probability (e.g., as part of the discovery pool configuration information transmitted using common RRC signaling, such as SIB type 19), to the UEs 104 and/or 108. The transmission probability may correspond to a probability with which the UE 104 or UE 108 should transmit its associated discovery MAC PDU. For example, in one embodiment, the transmission probability may be 0.25, 0.5, 0.75, or 1. A transmission probability of 1 may indicate that the UE may transmit a discovery MAC PDU in every discovery period of the allocated discovery pool, while a transmission probability of 0.75 may indicate that the UE will transmit a discovery MAC PDU in about 3 out of 4 discovery pools. The transmission probability may be used to reduce the number of discovery MAC PDUs that are transmitted in the discovery pool to prevent or reduce collisions between the discovery MAC PDUs. The eNB 112 (e.g., the control circuitry 152) may select the transmission probability based on any suitable factors, such as the loading of the cell from D2D UEs that are participating in D2D discovery.

In some embodiments, the transmission probability may be the same for all UEs associated with the cell. In other embodiments, the transmission probability may be UE-specific.

Various embodiments will be described with reference to the UE 104 transmitting a discovery MAC PDU and the UE 108 receiving the discovery MAC PDU. In embodiments, the UE 104 may also use the techniques described with respect to the UE 108, and the UE 108 may also use the techniques described with respect to the UE 104. For example, the UE 104 may also receive a discovery MAC PDU that is transmitted by the UE 108.

In various embodiments the control circuitry 120 of the UE 104 may obtain, via the communication circuitry 116, an allocation of discovery resources for a discovery pool to be used for D2D discovery. The control circuitry 120 may also obtain, via the communication circuitry 116, a transmission probability for transmission of a discovery MAC PDU. The transmission probability may be associated with one or more periods of the discovery pool.

In various embodiments, the control circuitry 120 may determine a pseudo-random number and compare the pseudo-random number with the transmission probability to determine whether to send the discovery MAC PDU in the discovery period. For example, the control circuitry 120 may determine to send the discovery MAC PDU in the discovery period if the pseudo-random number is less than the transmission probability, and may refrain from sending the discovery MAC PDU in the discovery period if the pseudo-random number is greater than the transmission probability. In some embodiments, the pseudo-random number and the transmission probability may both be values from 0 to 1.

In some embodiments, a plurality of discovery periods may be grouped together, and the transmission probability may be determined based on the number of discovery periods that are grouped together. The control circuitry 120 of the UE 104 may determine whether to transmit the discovery MAC PDU within the plurality of discovery periods (e.g., in one of the discovery periods of the plurality of discovery periods) based on a comparison of the pseudo-random number and the transmission probability. For example, the transmission probability may be 1/N for a group of N discovery periods. The UE 104 may transmit once within the group of N discovery pools if the generated pseudo-random number is less than 1/N. In some embodiments, the eNB 112 may determine the number of discovery pools that are grouped together, and may signal the number of discovery pools to the UE 104 and/or UE 108.

In various embodiments, the control circuitry 120 may determine the pseudo-random number based on one or more parameters, such as an identifier of the UE 104, information in the discovery MAC PDU, or information associated with the discovery pool. The identifier of the UE 104 may be, for example, a D2D UE identity that is a function of an international mobile subscriber identity (IMSI) of the UE 104, a D2D UE identity that is a function of a system architecture evolution temporary mobile subscriber identity (S-TMSI) of the UE 104, or a Layer 2 identifier (ID) of the UE 104.

The information in the discovery MAC PDU may include a field or bits of the discovery MAC PDU. For example, in some embodiments, the control circuitry 120 may determine the pseudo-random number based on a proximity services (ProSe) application code and/or a ProSe Function ID of the discovery MAC PDU. The ProSe application code and ProSe Function ID may be associated with the UE 104. Alternatively, the control circuitry 120 determine the pseudo-random number based on another set of bits of the discovery MAC PDU.

The information associated with the discovery pool may include, for example, a system frame number (SFN) or subframe number associated with the discovery pool. For example, in some embodiments, the control circuitry 120 may determine the pseudo-random number based on a function of the system frame number and the subframe number (e.g., index) of the first subframe included in the discovery pool.

In some embodiments, the control circuitry 120 may determine the pseudo-random number based on a pseudo-random binary sequence (PRBS). For example, the control circuitry 120 may determine a PRBS based on the identifier of the UE 104, the information in the discovery MAC PDU, or the information associated with the discovery pool. In some embodiments, the control circuitry 120 may initialize the PRBS (e.g., determine an initialization sequence for the PRBS, as further discussed below) based on the identifier of the UE 104, the information in the discovery MAC PDU, or the information associated with the discovery pool.

In some embodiments, the transmission probability and the information used by the UE 104 to determine the pseudo-random number may also be known to other UEs, such as the UE 108. Accordingly, the UE 108 may independently determine whether the UE 104 is to transmit the discovery MAC PDU in the discovery period. The determination by the UE 108 may allow the UE 108 (e.g., the control circuitry 132) to determine whether the UE 108 did not receive a discovery MAC PDU from the UE 104 because the UE 104 was not supposed to transmit a discovery MAC PDU or because the UE 104 has left the cell or is no longer participating in D2D discovery.

For example, the control circuitry 132 may receive, via the communication circuitry 128, a first discovery MAC PDU from the UE 104 in a first discovery period of a discovery pool. The control circuitry 132 may determine whether the UE 104 is to transmit a second discovery MAC PDU in a second discovery period based on the transmission probability associated with the UE 104. The control circuitry 132 may monitor for the second MAC PDU in the second discovery period based on the determination.

The control circuitry 132 may determine whether the UE 104 is to transmit the second discovery MAC PDU in the second discovery period, for example, by determining a pseudo-random number and comparing the pseudo-random number with the transmission probability. The control circuitry 132 may determine the pseudo-random number based on, for example, an identifier of the UE 104, information in the first discovery MAC PDU, or information associated with the second discovery period.

If the UE 108 determines that the UE 104 was supposed to transmit a discovery MAC PDU in the discovery pool, but the UE 108 did not receive the discovery MAC PDU, the UE 108 may determine that the UE 104 has left the area or is no longer participating in D2D discovery. It is also possible that the UE 104 did transmit the discovery MAC PDU, but that the UE 108 did not receive it due to resource collisions or half-duplex conflicts. Accordingly, in some embodiments, the UE 108 may determine that the UE 104 has left the area or is no longer participating in D2D discovery when the UE 108 has not received a discovery MAC PDU for a predetermined number of discovery periods for which the UE 104 determines that the UE 108 should have transmitted a discovery MAC PDU.

Additionally, or alternatively, the use of the pseudo-random number as described herein may allow a network entity (e.g., the eNB 112) to test whether the UE 104 is transmitting the discovery MAC PDU when it is supposed to based on the configured transmission probability.

In some embodiments, the UE 104 and/or UE 108 may adjust the transmission probability for a discovery pool based on whether the UE 104 transmitted a discovery MAC PDU in the preceding discovery pool or in a preceding number of discovery pools. For example, the UE 104 and/or UE 108 may increase the transmission probability for a discovery pool if the UE 104 has not transmitted a discovery MAC PDU in the previous two discovery pools.

In some embodiments, the discovery MAC PDU transmitted by the UE 104 may include a ProSe application code, a ProSe function ID, and a public land mobile network (PLMN) ID. In some embodiments, the ProSe application code may be 160 bits, the ProSe Function ID may be 8 bits, and/or the PLMN ID may be 24 bits, as shown in Table 1.

TABLE 1

| Field | Assessed Length |
|---|---|
| Prose Application Code | 160 bits |
| ProSe Function ID | 8 bits |
| PLMN ID | 24 bits |

Alternatively, the discovery MAC PDU transmitted by the UE 104 may include the fields shown in Table 2. The discovery MAC PDU with contents according to Table 2 may be used, for example, for public safety applications.

TABLE 2

| Field | Assessed Length | Purpose |
|---|---|---|
| Source L2 ID/ProSe UE ID of source | e.g. 48 bits | To identify a single UE source of the information in the message. This can be used for subsequent communication or to send a reply in Model B of operation |
| Destination L2 ID | e.g. 48 bits | To identify a single UE or group of UEs that are intended recipients of the information (a single UE in responses for model B). |
| Message type | 8 bits | Type of discovery message |
| Prose Application ID | 64 bits | Needed to perform matching to the required service Set/Discovery criterion |
| UE mode of operation | 2 bits | Defines whether a Public safety ProSe UE is acting as a UE-to-network relay, UE-to-UE or both or not acting as relay |
| PLMN ID | 24 bits | The PLMN ID the ProSe UE is attached to. |
| Status bits | 4 bits | Some status/maintenance flags. |

The fields and number of bits for each field are presented in Tables 1 and 2 as examples, and other embodiments of the discovery MAC PDU may include different fields or a different number of bits for a given field.

As discussed above, in some embodiments, the UE 104 and/or UE 108 may generate a PRBS and determine the pseudo-random number based on the PRBS. In some embodiments, the pseudo-random binary sequence may be defined by a length-31 Gold sequence. For example, the PRBS generator may generate an output sequence c(n) of length $M_{PN}$, where n=0, 1, . . . , $M_{PN}-1$, that is defined by:

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_c=1600$, and the first m-sequence is initialized with $x_1(0)=1$, $x_1(n)=0$, n=1, 2, . . . , 30. The initialization of the second m-sequence is denoted by $$c_{init} = \sum_{i=0}^{30} x_2(i) \cdot 2^i.$$

In some embodiments, the initialization sequence $c_{init}$ may be based on the identifier of the UE 104, the information in the discovery MAC PDU, or the information associated with the discovery pool.

As discussed above, in some embodiments, the pseudo-random number may be generated based on the SFN and/or a subframe associated with the discovery pool. For example, using the PRBS c(n), in some embodiments, the UE 104 and/or UE 108 may determine the pseudo-random number according to Equation (1) below:

$$p_{UE} = \sum_{i=0}^{L-1} c(L \cdot (10 \cdot SFN + firstSubFrameIdx) + i) \cdot 2^{-(i+1)} \quad \text{Equation (1)}$$

where $p_{UE}$ is the pseudo-random number, c corresponds to a PRBS generation function, SFN is a system frame number associated with the discovery pool, firstSubFrameIdx is an index of a first subframe of the discovery pool, and L is a positive integer (e.g., L=10).

In other embodiments, the UE 104 and/or UE 108 may determine the pseudo-random number based on bits of the discovery MAC PDU. For example, the pseudo-random number may be determined according to Equation (2):

$$p_{UE} = \sum_{i=0}^{L-1} c\left(L \cdot \left(\left(\sum_{j=0}^{M-1} DiscoveryMsg(j) \cdot 2^j\right) \bmod K\right) + i\right) * 2^{-(i+1)} \quad \text{Equation (2)}$$

where $p_{UE}$ is the pseudo-random number, c corresponds to a PRBS generation function, K is a pre-defined constant, DiscoveryMsg(j), j=0, 1, . . . , M-1 corresponds to a length-M set of indices of a coded version of the discovery MAC PDU or bits of an uncoded version of the discovery MAC PDU, and L is a positive integer. For example, in some embodiments, DiscoveryMsg(j), j=0, 1, . . . , M-1 may correspond to the M least significant bits (LSBs), M most significant bits (MSBs), or another set of M bits of the discovery MAC PDU.

In other embodiments, the UE 104 and/or UE 108 may determine the pseudo-random number based on an identifier associated with the UE 104. For example, the pseudo-random number may be determined according to Equation (3):

$$p_{UE} = \sum_{i=0}^{L-1} c(L \cdot UE\_ID + i) * 2^{-(i+1)} \quad \text{Equation (3)}$$

where UE_ID=IMSI mod K and IMSI is in decimal format, K is a pre-defined constant (e.g., K=1024), and L is a positive integer (e.g., L=10). In other embodiments, the UE_ID in Equation (3) may be similarly derived using the S-TMSI of the UE 104. The S-TMSI may have a value that ranges from 0 to $2^{41}-1$.

In some embodiments, the initialization sequence $c_{init}$ used to initialize the PRBS may be defined based on the identifier of the UE 104, the information in the discovery MAC PDU, or the information associated with the discovery pool. For example, in some embodiments, the initialization sequence $c_{init}$ may be defined by Equation (4):

$$c_{init} = \sum_{i=0}^{22} ProSeAppCode(i) \cdot 2^i + \sum_{i=23}^{30} ProSeFuncID(i-23) \cdot 2^i \quad \text{Equation (4)}$$

where ProSeAppCode(i), i=0, 1, ..., 22, corresponds to 23 bits of a ProSe Application Code or a ProSe Application ID of the discovery MAC PDU, and ProSeFuncID(i−23), i=23, 24, ..., 30, corresponds to 8 bits of a ProSe Function ID of the discovery MAC PDU.

In other embodiments, the initialization sequence $c_{init}$ may be defined by Equation (5):

$$c_{init} = \sum_{i=0}^{30} DiscoveryMsg(i) \cdot 2^i \quad \text{Equation (5)}$$

where DiscoveryMsg(i), i=0, 1, ..., 30 corresponds to 31 bits of the discovery MAC PDU (e.g., the 31 LSBs, 31 MSBs, or another set of 31 bits).

In other embodiments, the initialization sequence $c_{init}$ may be defined by Equation (6):

$$c_{init} = SFN \cdot 2^4 + firstSubFrameIdx \quad \text{Equation (6)}$$

where SFN is a system frame number associated with the discovery period of the discovery pool, firstSubFrameIdx is an index of a first subframe of the discovery period of the discovery pool. Defining the initialization sequence as a function of the configuration of the discovery period helps in reducing the computational complexity at receiving UEs. A receiving UE may generate a single initialization sequence that can be commonly used towards predicting the transmission events in the discovery period from all of the UEs for which the receiving UE may be monitoring the discovery resources.

In other embodiments, the initialization sequence $c_{init}$ may be determined based on Equation (7):

$$c_{init} = UE\_ID \quad \text{Equation (7)}$$

where UE_ID=IMSI mod K, IMSI is in decimal format, and K is a pre-defined constant. The constant K may be not greater than $2^{31}$. In some embodiments, the constant K may have a value smaller than $2^{31}$, such as 1024. In other embodiments, the UE_ID in Equation (7) may be similarly derived using the S-TMSI of the UE 104. The S-TMSI may have a value that ranges from 0 to 241−1.

In some embodiments, the UE 108 may not have knowledge of the identifier of UE 104 that is used by the UE 104 to generate the pseudo-random number. Such embodiments may be used when it is not necessary for the UE 108 to know the silencing pattern used by the UE 104 to transmit discovery MAC PDUs.

Figure 2:
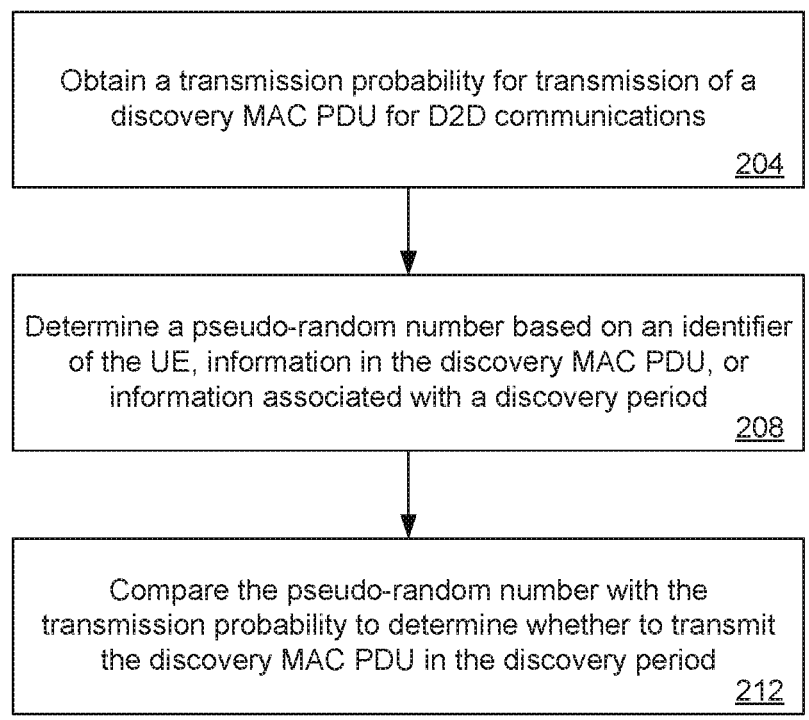
FIG. 2 is a flow diagram illustrating a method for D2D discovery, in accordance with various embodiments.

FIG. 2 is flow chart illustrating a method 200 for D2D discovery that may be performed by a UE (e.g., UE 104 or UE 108) in accordance with various embodiments. In some embodiments, the UE may include one or more non-transitory computer-readable media having instructions, stored thereon, that when executed cause the UE to perform the method 200.

At 204 of the method 200, the UE may obtain a transmission probability for transmission of a discovery MAC PDU for D2D communications. In some embodiments, the UE may receive the transmission probability from an eNB, such as the eNB 112.

At 208 of the method 200, the UE may determine a pseudo-random number based on an identifier of the UE, information in the discovery MAC PDU, or information associated with a discovery period of the allocated discovery pool. In some embodiments, the UE may determine a PRBS based on the identifier of the UE, the information in the MAC PDU, or the information associated with the discovery period of the allocated discovery pool, and the UE may determine the pseudo-random number based on the PRBS.

At 212 of the method 200, the UE may compare the pseudo-random number with the transmission probability to determine whether to transmit the discovery MAC PDU in the discovery period. For example, the UE may transmit the discovery MAC PDU in the discovery period if the pseudo-random number is less than the transmission probability, and may not send the discovery MAC PDU in the discovery period if the pseudo-random number is greater than the transmission probability.

Figure 3:
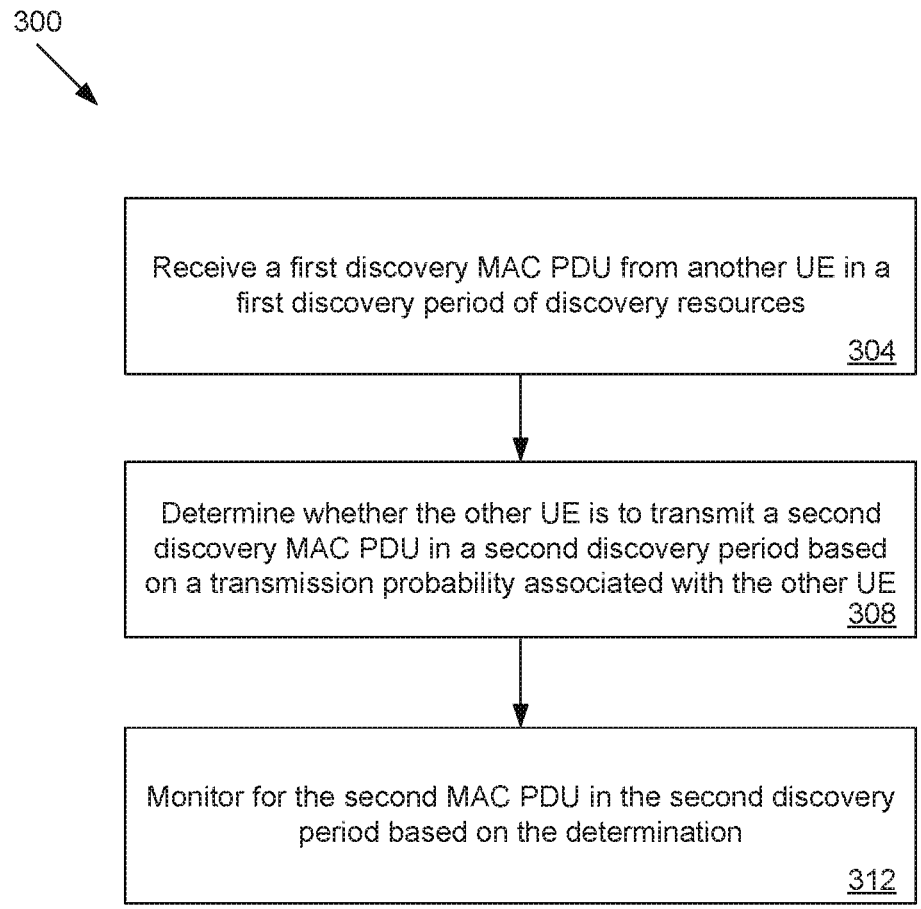
FIG. 3 is a flow diagram illustrating another method for D2D discovery, in accordance with various embodiments.

FIG. 3 is flow chart illustrating a method 300 for D2D discovery that may be performed by a UE (e.g., UE 104 or UE 108) in accordance with various embodiments. In some embodiments, the UE may include one or more non-transitory computer-readable media having instructions, stored thereon, that when executed cause the UE to perform the method 300.

At 304 of the method 300, the UE may receive a first discovery MAC PDU from another UE (e.g., the UE 108 or UE 104) in a first discovery period of a discovery resource pool.

At 308 of the method 300, the UE may determine whether the other UE is to transmit a second discovery MAC PDU in a second discovery period based on a transmission probability associated with the other UE. In some embodiments, the UE may receive the transmission probability from an eNB, such as the eNB 112. In some embodiments, the UE may also use the transmission probability to determine whether to transmit its own discovery MAC PDU in the first and/or second discovery period.

At 312 of the method 300, the UE may monitor for the second MAC PDU in the second discovery period based on the determination.

Figure 4:
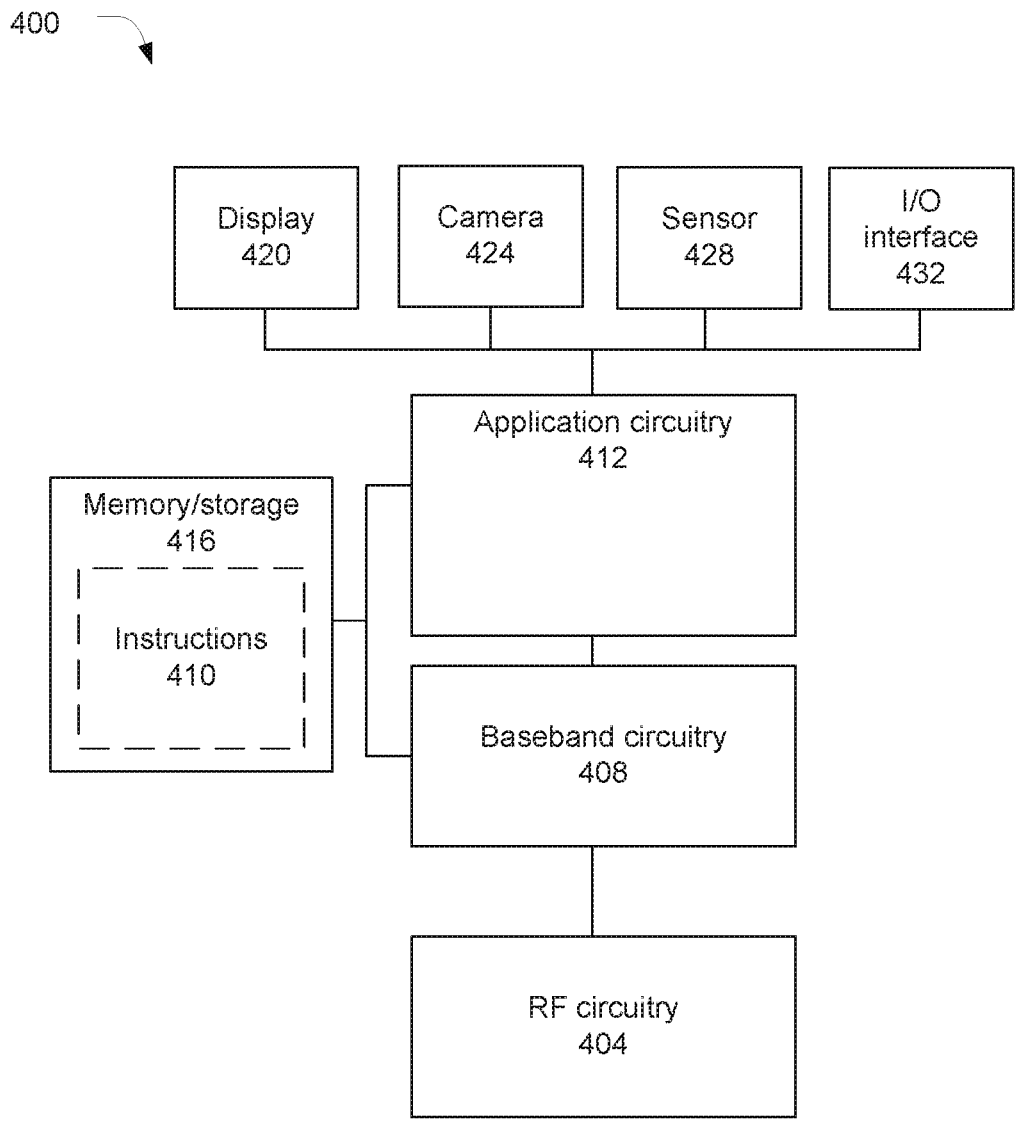
FIG. 4 is a block diagram illustrating a computing device adapted to operate in a wireless communication network, in accordance with various embodiments.

The UE 104, UE 108, and/or eNB 112 as described herein may be implemented into a system using any suitable hardware, firmware, and/or software configured as desired. For example, FIG. 4 illustrates, for one embodiment, an example system 400 that may correspond to a UE (e.g., UE 104 or UE 108) or eNB (e.g., eNB 112). Additionally, or alternatively, the system 400 may be adapted to perform one or more of the processes described herein (e.g., method 200 and/or 300). The system 400 may include radio frequency (RF) circuitry 404, baseband circuitry 408, application circuitry 412, memory/storage 416, display 420, camera 424, sensor 428, and input/output (I/O) interface 432, coupled with each other at least as shown.

The application circuitry 412 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 416 and configured to execute instructions stored in the memory/storage 416 to enable various applications and/or operating systems running on the system 400.

The baseband circuitry 408 may include circuitry such as, but not limited to, one or more single-core or multi-core processors. The processor(s) may include a baseband processor. The baseband circuitry 408 may handle various radio control functions that enable communication with one or more radio networks via the RF circuitry 404. The radio control functions may include, but are not limited to, signal modulation, encoding, decoding, radio frequency shifting, etc. In some embodiments, the baseband circuitry 408 may provide for communication compatible with one or more radio technologies. For example, in some embodiments, the baseband circuitry 408 may support communication with an E-UTRAN and/or other wireless metropolitan area networks (WMAN), a wireless local area network (WLAN), or a wireless personal area network (WPAN). Embodiments in which the baseband circuitry 408 is configured to support radio communications of more than one wireless protocol may be referred to as multi-mode baseband circuitry.

In various embodiments, baseband circuitry 408 may include circuitry to operate with signals that are not strictly considered as being in a baseband frequency. For example, in some embodiments, baseband circuitry 408 may include circuitry to operate with signals having an intermediate frequency, which is between a baseband frequency and a radio frequency.

In some embodiments, the communication circuitry 116, communication circuitry 128, communication circuitry 140, control circuitry 120, control circuitry 132, and/or control circuitry 152 may be embodied in the application circuitry 412 and/or the baseband circuitry 408. Alternatively, the communication circuitry 116, 128, and/or 140 may be embodied in the RF circuitry 404.

RF circuitry 404 may enable communication with wireless networks using modulated electromagnetic radiation through a non-solid medium. In various embodiments, the RF circuitry 404 may include switches, filters, amplifiers, etc., to facilitate the communication with the wireless network. The radio transceiver 122, radio transceiver 134, and/or radio transceiver 144 may be embodied in the RF circuitry 404.

In various embodiments, RF circuitry 404 may include circuitry to operate with signals that are not strictly considered as being in a radio frequency. For example, in some embodiments, RF circuitry 404 may include circuitry to operate with signals having an intermediate frequency, which is between a baseband frequency and a radio frequency.

In some embodiments, some or all of the constituent components of the baseband circuitry 408, the application circuitry 412, and/or the memory/storage 416 may be implemented together on a system on a chip (SOC).

Memory/storage 416 may be used to load and store data and/or instructions, for example instructions 410 which may be configured to cause system 400 to carry out any portion of the processes described herein (e.g., method 200 and/or 300). Memory/storage 416 for one embodiment may include any combination of suitable volatile memory (e.g., dynamic random access memory (DRAM)) and/or non-volatile memory (e.g., Flash memory).

In various embodiments, the I/O interface 432 may include one or more user interfaces designed to enable user interaction with the system 400 and/or peripheral component interfaces designed to enable peripheral component interaction with the system 400. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 428 may include one or more sensing devices to determine environmental conditions and/or location information related to the system 400. In some embodiments, the sensors may include, but are not limited to, a gyro sensor, an accelerometer, a proximity sensor, an ambient light sensor, and a positioning unit. The positioning unit may also be part of, or interact with, the baseband circuitry 408 and/or RF circuitry 404 to communicate with components of a positioning network, e.g., a global positioning system (GPS) satellite.

In various embodiments, the display 420 may include a display (e.g., a liquid crystal display, a touch screen display, etc.).

In some embodiments, the system 400 may be a mobile computing device such as, but not limited to, a laptop computing device, a tablet computing device, a netbook, an ultrabook, a smartphone, etc. Alternatively, or additionally, the system 400 may be a relatively non-mobile computing device such as, but not limited to, a desktop computing device, a set-top box, a gaming console, a media player, a smart metering device, an appliance, a security system (e.g., a surveillance device), and the like. In various embodiments, system 400 may have more or fewer components, and/or different architectures.

Some non-limiting Examples are provided below.

Example 1 is an apparatus to be employed by a user equipment (UE), the apparatus comprising: communication circuitry to interface with a radio transceiver to wirelessly communicate with an evolved Node B (eNB); and control circuitry coupled to the communication circuitry. The control circuitry is to: obtain, via the communication circuitry, a transmission probability from the eNB for transmission of a discovery medium access control (MAC) protocol data unit (PDU) for device-to-device (D2D) communications; determine a pseudo-random number based on an identifier of the UE, information in the discovery MAC PDU, or information associated with a discovery period; and compare the pseudo-random number with the transmission probability to determine whether to send the discovery MAC PDU in the discovery period.

Example 2 is the apparatus of Example 1, wherein the control circuitry is to: determine a pseudo-random binary sequence (PRBS) based on the identifier of the UE, the information in the MAC PDU, or the information associated with the discovery period; and determine the pseudo-random number based on the PRBS.

Example 3 is the apparatus of Example 2, wherein the control circuitry is to initialize the PRBS based on the identifier of the UE, a field or bits of the discovery MAC PDU, or a system frame number (SFN) or a subframe number associated with the discovery period.

Example 4 is the apparatus of Example 1, wherein the control circuitry is to determine the pseudo-random number based on the identifier of the UE, wherein the identifier is a D2D UE identity that is a function of an international mobile subscriber identity (IMSI) of the UE, a D2D UE identity that is a function of a system architecture evolution temporary mobile subscriber identity (S-TMSI) of the UE, or a Layer 2 identifier (ID) of the UE.

Example 5 is the apparatus of Example 1, wherein the control circuitry is to determine the pseudo-random number based on a field or bits of the discovery MAC PDU.

Example 6 is the apparatus of Example 5, wherein the control circuitry is to determine the pseudo-random number based on a ProSe application code and a ProSe Function ID of the discovery MAC PDU.

Example 7 is the apparatus of Example 1, wherein the control circuitry is to determine the pseudo-random number based on a system frame number (SFN) or a subframe number associated with the discovery period.

Example 8 is the apparatus of any one of Examples 1 to 7, wherein the discovery period is a first discovery period and the discovery MAC PDU is a first discovery MAC PDU, and wherein the control circuitry is further to adjust the transmission probability for determination of whether to transmit a second discovery MAC PDU in a second discovery period based on whether the first discovery MAC PDU was transmitted in the first discovery period.

Example 9 is the apparatus of any one of Examples 1 to 7, wherein the discovery period is a first discovery period, and wherein the control circuitry is to compare the pseudo-random number with the transmission probability to determine whether to transmit the discovery MAC PDU in a set of discovery periods that includes the first discovery period.

Example 10 is an apparatus to be employed by a first user equipment (UE), the apparatus comprising: communication circuitry to interface with a radio transceiver to wirelessly communicate with a second UE via device-to-device (D2D) communication; and control circuitry coupled to the communication circuitry. The control circuitry is to: receive, via the communication circuitry, a first discovery medium access control (MAC) protocol data unit (PDU) from the second UE in a first discovery period; determine whether the second UE is to transmit a second discovery MAC PDU in a second discovery period based on a transmission probability associated with the second UE; and monitor for the second MAC PDU in the second discovery period based on the determination.

Example 11 is the apparatus of Example 10, wherein the control circuitry is to: determine a pseudo-random binary number based on an identifier of the second UE, information in the first discovery MAC PDU, or information associated with the second discovery period; and compare the pseudo-random number with the transmission probability to determine whether the second UE is to transmit the second discovery MAC PDU in the second discovery period.

Example 12 is the apparatus of Example 11, wherein the control circuitry is to determine the pseudo-random number based on a field or bits of the discovery MAC PDU.

Example 13 is the apparatus of Example 12, wherein the control circuitry is to determine the pseudo-random number based on a ProSe application code and a ProSe Function ID of the discovery MAC PDU.

Example 14 is the apparatus of Example 11, wherein the control circuitry is to determine the pseudo-random number based on a system frame number (SFN) or a subframe number associated with the discovery period.

Example 15 is the apparatus of any one of Examples 11 to 14, wherein the control circuitry is to: determine a pseudo-random binary sequence (PRBS) based on the identifier of the second UE, the information in the first MAC PDU, or the information associated with the second discovery period; and determine the pseudo-random number based on the PRBS.

Example 16 is the apparatus of Example 15, wherein the control circuitry is to initialize the PRBS based on the identifier of the second UE, a field or bits of the first discovery MAC PDU, or a system frame number (SFN) or a subframe number associated with the second discovery period.

Example 17 is one or more non-transitory computer-readable media having instructions, stored thereon, that when executed cause a user equipment (UE) to: obtain a transmission probability for transmission of a discovery medium access control (MAC) protocol data unit (PDU) for device-to-device (D2D) communications; determine a pseudo-random binary sequence (PRBS) based on an identifier of the UE, information in the discovery MAC PDU, or information associated with a discovery period; determine a pseudo-random number based on the PRBS; and determine whether to send the discovery MAC PDU in the discovery period based on the pseudo-random number and the transmission probability.

Example 18 is the one or more media of Example 17, wherein the instructions, when executed, further cause the UE to transmit the discovery MAC PDU in the discovery period if the pseudo-random number is less than the transmission probability, and to refrain from sending the discovery MAC PDU in the discovery period if the pseudo-random number is greater than the transmission probability.

Example 19 is the one or more media of Example 17, wherein the pseudo-random number is determined by:

$$p_{UE} = \sum_{i=0}^{L-1} c(L \cdot (10 \cdot SFN + firstSubFrameIdx) + i) \cdot 2^{-(i+1)}$$

where $p_{UE}$ is the pseudo-random number, c corresponds to a PRBS generation function, SFN is a system frame number associated with the discovery period, firstSubFrameIdx is an index of a first subframe of the discovery period, and L is a positive integer.

Example 20 is the one or more media of Example 17, wherein the pseudo-random number is determined by:

$$p_{UE} = \sum_{i=0}^{L-1} c\left(L \cdot \left(\left(\sum_{j=0}^{M-1} DiscoveryMsg(j) \cdot 2^j\right) \mod K\right) + i\right) * 2^{-(i+1)}$$

where $p_{UE}$ is the pseudo-random number, c corresponds to a PRBS generation function, K is a pre-defined constant, DiscoveryMsg(j), j=0, 1, . . . , M−1 corresponds to a length-M set of indices of a coded version of the first discovery MAC PDU or bits of an uncoded version of the first discovery MAC PDU, and L is a positive integer.

Example 21 is the one or more media of any one of Examples 17 to 20, wherein the instructions, when executed, further cause the UE to initialize the PRBS with an initial sequence $c_{init}$ according to:

$$c_{init} = \sum_{i=0}^{22} ProSeAppCode(i) \cdot 2^i + \sum_{i=23}^{30} ProSeFuncID(i-23) \cdot 2^i$$

where ProSeAppCode(i), i=0, 1, . . . , 22, corresponds to 23 bits of a ProSe Application Code or a ProSe Application ID of the discovery MAC PDU, and ProSeFuncID(i−23), i=23, 24, . . . , 30, corresponds to 8 bits of a ProSe Function ID of the discovery MAC PDU.

Example 22 is the one or more media of any one of Examples 17 to 20, wherein the instructions, when executed, further cause the UE to initialize the PRBS with an initial sequence $c_{init}$ according to:

$$c_{init} = \sum_{i=0}^{30} DiscoveryMsg(i) \cdot 2^i$$

where DiscoveryMsg(i), i=0, 1, . . . , 30, corresponds to 31 bits of the discovery MAC PDU.

Example 23 is the one or more media of Example 17, wherein the pseudo-random number is determined based on a field or bits of the discovery MAC PDU.

Example 24 is the one or more media of Example 17, wherein the pseudo-random number is determined based on a system frame number (SFN) or a subframe number associated with the discovery period.

Example 25 is an apparatus to be employed by a user equipment (UE), the apparatus comprising: means to obtain a transmission probability for transmission of a discovery medium access control (MAC) protocol data unit (PDU) for device-to-device (D2D) communications; means to determine a pseudo-random binary sequence (PRBS) based on an identifier of the UE, information in the discovery MAC PDU, or information associated with a discovery period; means to determine a pseudo-random number based on the PRBS; and means to determine whether to transmit the discovery MAC PDU in the discovery period based on the pseudo-random number and the transmission probability.

Example 26 is the apparatus of Example 25, further comprising means to transmit the discovery MAC PDU in the discovery period if the pseudo-random number is less than the transmission probability, and to refrain from sending the discovery MAC PDU in the discovery period if the pseudo-random number is greater than the transmission probability.

Example 27 is the apparatus of Example 25, wherein the pseudo-random number is determined by:

$$p_{UE} = \sum_{i=0}^{L-1} c(L \cdot (10 \cdot SFN + firstSubFrameIdx) + i) \cdot 2^{-(i+1)}$$

where $p_{UE}$ is the pseudo-random number, c corresponds to a pseudo-random binary sequence (PRBS) generation function, SFN is a system frame number associated with the discovery period, firstSubFrameIdx is an index of a first subframe of the discovery period, and L is a positive integer.

Example 28 is the apparatus of Example 25, wherein the pseudo-random number is determined by:

$$p_{UE} = \sum_{i=0}^{L-1} c\left(L \cdot \left(\left(\sum_{j=0}^{M-1} DiscoveryMsg(j) \cdot 2^j\right) \mod K\right) + i\right) * 2^{-(i+1)}$$

where $p_{UE}$ is the pseudo-random number, c corresponds to a pseudo-random binary sequence (PRBS) generation function, K is a pre-defined constant, DiscoveryMsg(j), j=0, 1, . . . , M−1 corresponds to a length-M set of indices of a coded version of the discovery MAC PDU or bits of an uncoded version of the discovery MAC PDU, and L is a positive integer.

Example 29 is the apparatus of any one of Examples 25 to 28, further comprising means to initialize the PRBS with an initial sequence $c_{init}$ according to:

$$c_{init} = \sum_{i=0}^{22} ProSeAppCode(i) \cdot 2^i + \sum_{i=23}^{30} ProSeFuncID(i-23) \cdot 2^i$$

where ProSeAppCode(i), i=0, 1, . . . , 22, corresponds to 23 bits of a ProSe Application Code or a ProSe Application ID of the discovery MAC PDU, and ProSeFuncID(i−23), i=23, 24, . . . , 30, corresponds to 8 bits of a ProSe Function ID of the discovery MAC PDU.

Example 30 is the apparatus of any one of Examples 25 to 28, further comprising means to initialize the PRBS with an initial sequence $c_{init}$ according to:

$$c_{init} = \sum_{i=0}^{30} DiscoveryMsg(i) \cdot 2^i$$

where DiscoveryMsg(i), i=0, 1, . . . , 30, corresponds to 31 bits of the discovery MAC PDU.

Example 31 is the apparatus of Example 25, wherein the pseudo-random number is determined based on a field or bits of the discovery MAC PDU.

Example 32 is the apparatus of Example 25, wherein the pseudo-random number is determined based on a system frame number (SFN) or a subframe number associated with the discovery period.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus to be employed by a user equipment (UE), the apparatus comprising: communication circuitry to interface with a radio transceiver to wirelessly communicate with an evolved Node B (eNB); and control circuitry coupled to the communication circuitry, the control circuitry to: obtain, via the communication circuitry, a transmission probability from the eNB for transmission of a discovery medium access control (MAC) protocol data unit (PDU) for device-to-device (D32D) communications; determine a pseudo-random number based on a ProSe application code and a ProSe Function ID in the discovery MAC PDU; and compare the pseudo-random number with the transmission probability to determine whether to send the discovery MAC PDU in a discovery period.

2. The apparatus of claim 1, wherein the control circuitry is to:
    determine a pseudo-random binary sequence (PRBS) based on the ProSe application code and the ProSe Function ID; and
    determine the pseudo-random number based on the PRBS.

3. The apparatus of claim 2, wherein the control circuitry is to initialize the PRBS based on a field or bits of the discovery MAC PDU, or a system frame number (SFN) or a subframe number associated with the discovery period.

4. The apparatus of claim 1, wherein the discovery period is a first discovery period and the discovery MAC PDU is a first discovery MAC PDU, and wherein the control circuitry is further to adjust the transmission probability for determination of whether to transmit a second discovery MAC PDU in a second discovery period based on whether the first discovery MAC PDU was transmitted in the first discovery period.

5. The apparatus of claim 1, wherein the discovery period is a first discovery period, and wherein the control circuitry is to compare the pseudo-random number with the transmission probability to determine whether to transmit the discovery MAC PDU in a set of discovery periods that includes the first discovery period.

6. One or more non-transitory computer-readable media having instructions, stored thereon, that when executed cause a user equipment (UE) to: obtain a transmission probability for transmission of a discovery medium access control (MAC) protocol data unit (PDU) for device-to-device (D32D) communications; determine a pseudo-random binary sequence (PRBS) based on a ProSe application code and a ProSe Function ID in the discovery MAC PDU; determine a pseudo-random number based on the PRBS; and determine whether to send the discovery MAC PDU in a discovery period based on the a pseudo-random number and the transmission probability.

7. The one or more media of claim 6, wherein the instructions, when executed, further cause the UE to transmit the discovery MAC PDU in the discovery period if the pseudo-random number is less than the transmission probability, and to refrain from sending the discovery MAC PDU in the discovery period if the pseudo-random number is greater than the transmission probability.

8. The one or more media of claim 6, wherein the instructions, when executed, further cause the UE to initialize the PRBS with an initial sequence $c_{init}$ according to:

$$c_{init} = \sum_{i=0}^{22} ProSeAppCode(i) \cdot 2^i + \sum_{i=23}^{30} ProSeFuncID(i-23) \cdot 2^i$$

where ProSeAppCode(i), i=0, 1, ..., 22, corresponds to 23 bits of the ProSe Application Code of the discovery MAC PDU, and ProSeFuncID(i−23), i=23, 24, ..., 30, corresponds to 8 bits of the ProSe Function ID of the discovery MAC PDU.

9. One or more non-transitory computer-readable media having instructions, stored thereon, that when executed cause a user equipment (UE) to:
    obtain a transmission probability for transmission of a discovery medium access control (MAC) protocol data unit (PDU) for device-to-device (D2D) communications;
    determine a pseudo-random binary sequence (PRBS);
    determine a pseudo-random number based on the PRBS; and
    determine whether to send the discovery MAC PDU in a discovery period based on the pseudo-random number and the transmission probability;
    wherein the pseudo-random number is determined by:

$$p_{UE} = \sum_{i=0}^{L-1} c(L \cdot (10 \cdot SFN + firstSubFrameIdx) + i) \cdot 2^{-(i+1)}$$

where $p_{UE}$ is the pseudo-random number, c corresponds to a PRBS generation function, SFN is a system frame number associated with the discovery period, firstSubFrameIdx is an index of a first subframe of the discovery period, and Lisa positive integer.

10. The one or more media of claim 9, wherein the instructions, when executed, further cause the UE to transmit the discovery MAC PDU in the discovery period if the pseudo-random number is less than the transmission probability, and to refrain from sending the discovery MAC PDU in the discovery period if the pseudo-random number is greater than the transmission probability.

11. One or more non-transitory computer-readable media having instructions, stored thereon, that when executed cause a user equipment (UE) to:
    obtain a transmission probability for transmission of a discovery medium access control (MAC) protocol data unit (PDU) for device-to-device (D2D) communications;
    determine a pseudo-random binary sequence (PRBS);
    determine a pseudo-random number based on the PRBS; and
    determine whether to send the discovery MAC PDU in a discovery period based on the pseudo-random number and the transmission probability;

wherein the pseudo-random number is determined by:

$$p_{UE} = \sum_{i=0}^{L-1} c\left(L \cdot \left[\left(\sum_{j=0}^{M-1} DiscoveryMsg(j) \cdot 2^j\right) \bmod K\right] + i\right) * 2^{-(i+1)}$$

where $p_{UE}$ is the pseudo-random number, c corresponds to a PRBS generation function, K is a pre-defined constant, DiscoveryMsg(j), j=0, 1, . . . , M−1 corresponds to a length-M set of indices of a coded version of the discovery MAC PDU or bits of an uncoded version of the discovery MAC PDU, and L is a positive integer.

12. The one or more media of claim 11, wherein the instructions, when executed, further cause the UE to transmit the discovery MAC PDU in the discovery period if the pseudo-random number is less than the transmission probability, and to refrain from sending the discovery MAC PDU in the discovery period if the pseudo-random number is greater than the transmission probability.

13. One or more non-transitory computer-readable media having instructions, stored thereon, that when executed cause a user equipment (UE) to:
obtain a transmission probability for transmission of a discovery medium access control (MAC) protocol data unit (PDU) for device-to-device (D2D) communications;
determine a pseudo-random binary sequence (PRBS), wherein, to determine the PRBS, the UE is to initialize the PRBS with an initial sequence $c_{init}$ according to:

$$c_{init} = \sum_{i=0}^{30} DiscoveryMsg(i) \cdot 2^i$$

where DiscoveryMsg(i), i=0, 1, . . . , 30, corresponds to 31 bits of the discovery MAC PDU;
determine a pseudo-random number based on the PRBS; and
determine whether to send the discovery MAC PDU in a discovery period based on the pseudo-random number and the transmission probability.

14. The one or more media of claim 13, wherein the instructions, when executed, further cause the UE to transmit the discovery MAC PDU in the discovery period if the pseudo-random number is less than the transmission probability, and to refrain from sending the discovery MAC PDU in the discovery period if the pseudo-random number is greater than the transmission probability.

* * * * *